(12) United States Patent
Go et al.

(10) Patent No.: US 8,019,997 B2
(45) Date of Patent: *Sep. 13, 2011

(54) INFORMATION PROCESSING APPARATUS AND METHOD, RECORDING MEDIUM, AND PROGRAM

(75) Inventors: Naomi Go, Kanagawa (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1332 days.

This patent is subject to a terminal disclaimer.

(21) Appl. No.: 11/561,687

(22) Filed: Nov. 20, 2006

(65) Prior Publication Data

US 2007/0094502 A1    Apr. 26, 2007

Related U.S. Application Data

(63) Continuation of application No. 10/293,617, filed on Nov. 14, 2002, now Pat. No. 7,178,028.

(30) Foreign Application Priority Data

Nov. 15, 2001    (JP) ................................. 2001-349649

(51) Int. Cl.
*H04L 9/32*    (2006.01)
(52) U.S. Cl. ........ 713/170; 713/165; 713/168; 713/169; 713/171; 713/176; 713/189; 713/192; 380/203; 380/210; 380/270; 380/277; 380/281
(58) Field of Classification Search .................. 713/176, 713/189, 194, 165, 168–171, 192; 380/270, 380/277, 203, 210, 281
See application file for complete search history.

(56) References Cited

U.S. PATENT DOCUMENTS

| 5,623,637 | A | 4/1997 | Jones et al. | |
| 6,697,944 | B1 | 2/2004 | Jones et al. | |
| 7,266,202 | B1 * | 9/2007 | Kawakami et al. | 380/283 |
| 7,373,506 | B2 * | 5/2008 | Asano et al. | 713/168 |
| 7,698,571 | B2 * | 4/2010 | Harada et al. | 713/193 |
| 7,752,460 | B2 * | 7/2010 | Shibuya et al. | 713/193 |
| 2002/0034302 | A1 | 3/2002 | Moriai et al. | |
| 2002/0066018 | A1 | 5/2002 | Linnartz | |

FOREIGN PATENT DOCUMENTS

JP    2001-249899    9/2001

* cited by examiner

*Primary Examiner* — Thanhnga B Truong
(74) *Attorney, Agent, or Firm* — Oblon, Spivak, McClelland, Maier & Neustadt, L.L.P.

(57) ABSTRACT

The present invention relates to an information processing apparatus by which a communication channel providing a high degree of privacy is established between a PDA and a data communication server. Data encrypted with a temporary key is shared by a PDA and a memory card. The memory card decrypts the data by the shared temporary key, and then stores the data in the memory card. Data encrypted with a temporary key shared by a PC and the memory card. The PC decrypts the data by the shared temporary key, and then stores the data in the PC. The PC and the data communication server are connected to each other, and perform mutual authentication. The data encrypted with a temporary key shared by the PC and the data communication server as a result of the authentication is transmitted from the PC to the data communication server via a broadband network.

11 Claims, 10 Drawing Sheets

F I G. 4
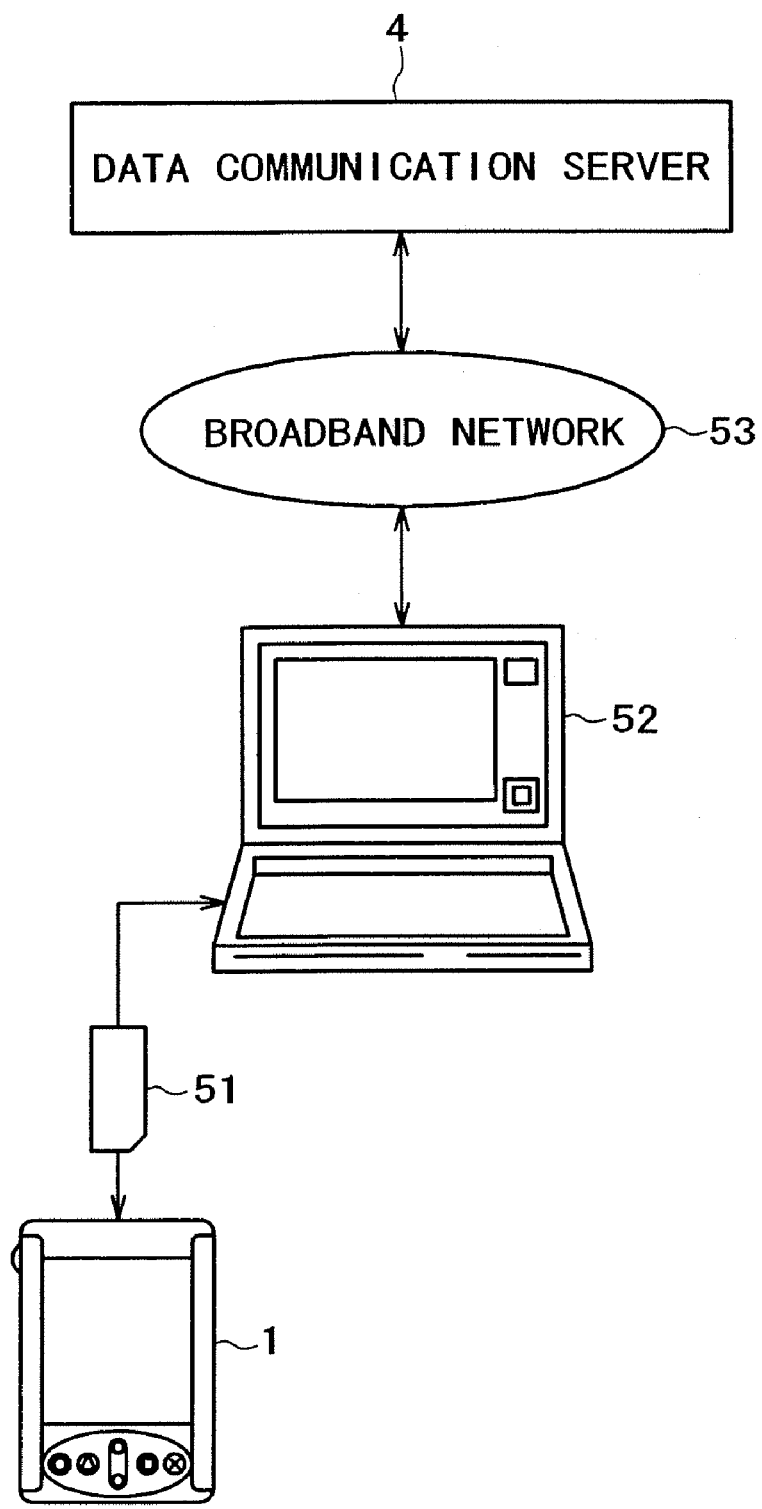

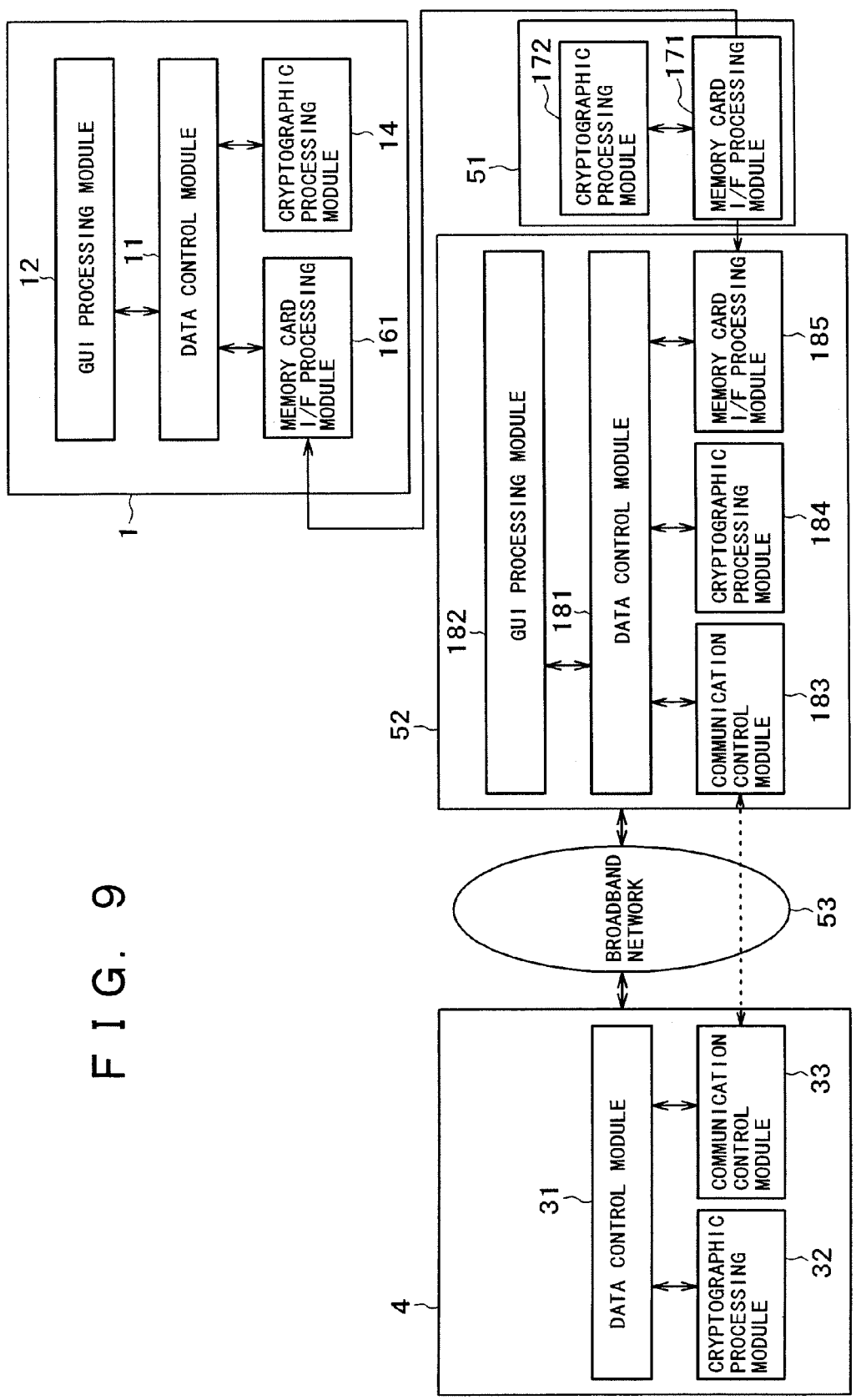

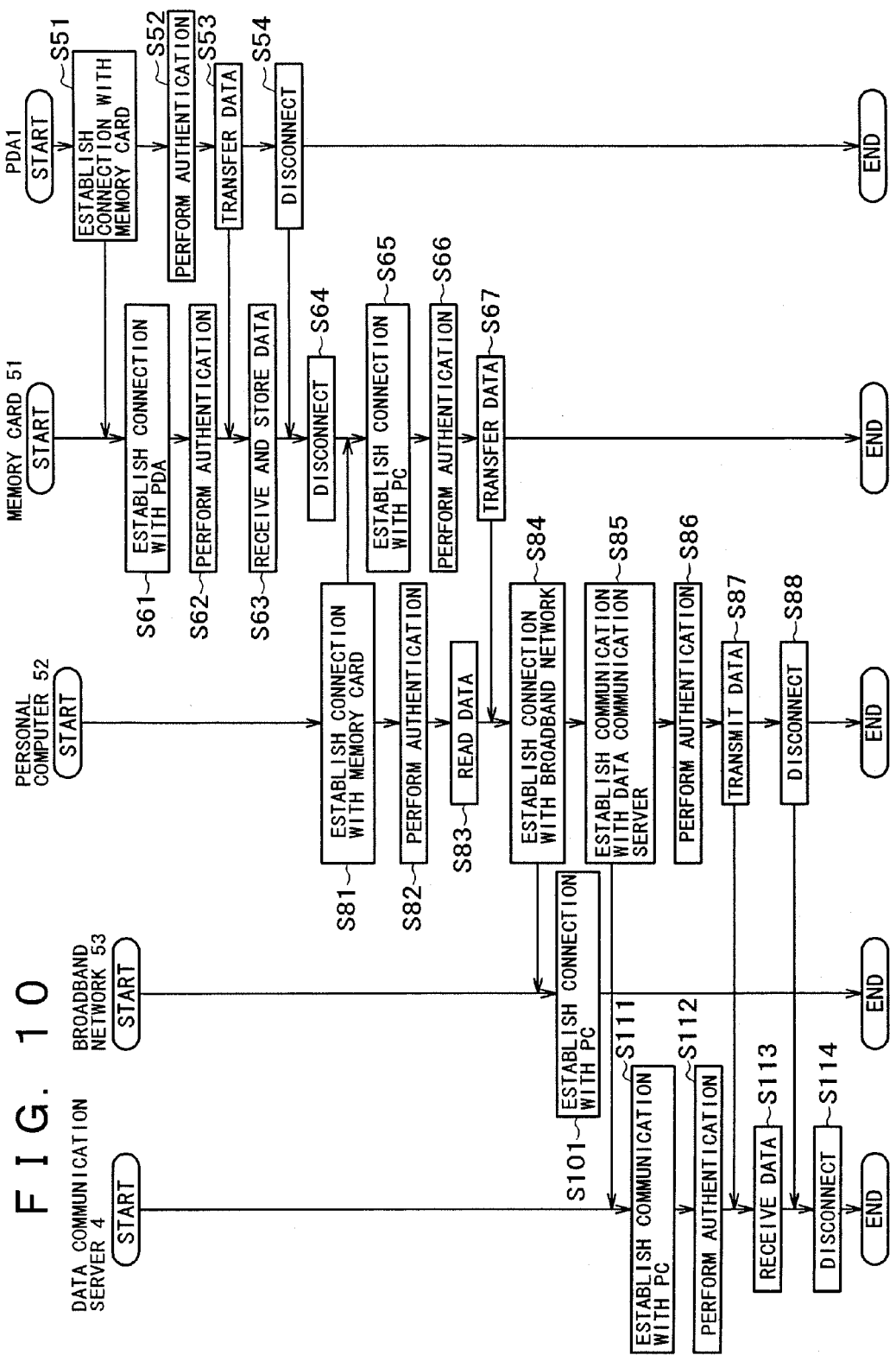

INFORMATION PROCESSING APPARATUS AND METHOD, RECORDING MEDIUM, AND PROGRAM

CROSS-REFERENCE TO RELATED APPLICATIONS

This application is a Continuation of U.S. patent application Ser. No. 10/293,617, filed Nov. 14, 2002, and claims priority to Japanese Patent Application No. 2001-349649, filed Nov. 15, 2001. The contents of U.S. patent application Ser. No. 10/293,617 are incorporated herein by reference in their entirety.

BACKGROUND OF THE INVENTION

The present invention relates to an apparatus and a method for information processing, a recording medium, and a program, and particularly to an apparatus and a method for information processing, a recording medium, and a program for establishing a broadband communication channel providing a high degree of privacy in data communication between a portable type information terminal apparatus such as a PDA (Personal Digital Assistant) and a server, for example.

FIG. 1 is a diagram showing an example of configuration of a related-art digital data communication system. In this digital data communication system, a radio communication network 3 is connected with a radio communication terminal apparatus 2 and a data communication server 4. The radio communication terminal apparatus 2 is connected with a PDA 1.

The PDA 1 is connectable to the radio communication terminal apparatus 2, and hence connectable to the data communication server 4 via the radio communication terminal apparatus 2 and the radio communication network 3. For example, the PDA 1 sends a request for delivery of data to the data communication server 4 via the radio communication terminal apparatus 2 and the radio communication network 3 on the basis of user operation, and receives the data delivered thereto from the data communication server 4 via the radio communication network 3. Also, the PDA 1 can transmit data recorded within the PDA 1 to the data communication server 4 via the radio communication terminal apparatus 2 and the radio communication network 3.

The radio communication network 3 is connected by radio to the radio communication terminal apparatus 2 such as a digital portable telephone or the like, or the data communication server 4 using a radio communication function of PHS (Personal Handyphone System) or W-CDMA (Wideband-Code Division Multiple Access), for example, and thereby performs data communication.

The data communication server 4 receives the request for delivery of the data transmitted thereto from the PDA 1 via the radio communication network 3, and then delivers (supplies) the corresponding data via the radio communication network 3. The data communication server 4 also receives the data transmitted thereto from the PDA 1 via the radio communication network 3.

A configuration of functions (modules) of the related-art digital data transmission system will next be described with reference to FIG. 2.

On the basis of an input signal from a GUI (Graphical User Interface) processing module 12, a data control module 11 of the PDA 1 controls data communication of a communication control module 13. The data control module 11 also controls data encryption processing or decryption processing of a cryptographic processing module 14 on the basis of an input signal from the GUI processing module 12.

When a user operates a GUI of the PDA 1, the GUI processing module 12 supplies an input signal for connection to the data communication server 4 to the data control module 11. Under control of the data control module 11, the communication control module 13 is connected to a communication control module 21 of the radio communication terminal apparatus 2. The cryptographic processing module 14 encrypts or decrypts data under control of the data control module 11.

The communication control module 21 of the radio communication terminal apparatus 2 is connected to the communication control module 13 of the PDA 1. The communication control module 21 is also connected to a communication control module 33 of the data communication server 4 via the radio communication network 3.

A data control module 31 of the data communication server 4 controls data encryption processing or decryption processing of a cryptographic processing module 32 and controls data communication of the communication control module 33. The data control module 31 also manages data exchanged in data communication.

The cryptographic processing module 32 encrypts or decrypts data under control of the data control module 31. The communication control module 33 is connected to the communication control module 21 of the radio communication terminal apparatus 2 via the radio communication network 3 under control of the data control module 31.

Related-art processing for the PDA 1 to transmit data to the data communication server 4 will next be described with reference to a flowchart of FIG. 3.

At a step S1, on the basis of an input signal (signal corresponding to an operation for being connected to the data communication server 4) supplied from the GUI processing module 12, the data control module 11 of the PDA 1 controls data communication of the communication control module 13. Under control of the data control module 11, the communication control module 13 establishes connection with the communication control module 21 of the radio communication terminal apparatus 2. At a step S11, the communication control module 21 of the radio communication terminal apparatus 2 establishes connection with the communication control module 13 of the PDA 1.

At a step S2, the communication control module 13 of the PDA 1 establishes connection with the radio communication network 3 via the communication control module 21 of the radio communication terminal apparatus 2. At a step S21, a base station not shown in the figure of the radio communication network 3 establishes connection with the PDA 1 via the communication control module 21 of the radio communication terminal apparatus 2.

At a step S3, the communication control module 13 of the PDA 1 establishes communication with the communication control module 33 of the data communication server 4 via the communication control module 21 of the radio communication terminal apparatus 2 and the radio communication network 3. At a step S31, the communication control module 33 of the data communication server 4 establishes communication with the communication control module 13 of the PDA 1 via the radio communication network 3 and the communication control module 21 of the radio communication terminal apparatus 2 under control of the data control module 31.

At a step S4, in order to prevent interception and falsification of data and the like, the data control module 11 of the PDA 1 controls the cryptographic processing module 14 so that the cryptographic processing module 14 encrypts transmission data. Then, the data control module 11 controls the communication control module 13 so that the communication control module 13 transmits the data encrypted by the cryptographic processing module 14 to the data communication server 4 via the radio communication terminal apparatus 2 and the radio communication network 3. At a step S32, the data control module 31 of the data communication server 4 controls the communication control module 33 so that the communication control module 33 receives the data transmitted by the PDA 1. The data control module 31 controls the cryptographic processing module 32 so that the cryptographic processing module 32 decrypts the encrypted data received by the communication control module 33.

At a step S5, the communication control module 13 of the PDA 1 is disconnected from the data communication server 4 under control of the data control module 11. At a step S33, the communication control module 33 of the data communication server 4 is disconnected from the PDA 1 under control of the data control module 31.

Thus, data communication between the PDA 1 and the data communication server 4 is performed through radio connection by PHS, W-CDMA or the like.

However, radio communication by PHS, W-CDMA or the like has a problem of a lower data transfer rate as compared with wire communication by optical fiber ADSL (Asymmetric Digital Subscriber Line) or the like or communication by satellite, which has recently been spreading, and a problem of a higher communication cost for each bit of transmission data even when the transfer rate is the same.

In addition, with the radio communication, a communication channel becomes unstable depending on conditions of radio waves, and therefore communication tends to be interrupted.

Furthermore, it is difficult to establish a broadband communication channel providing a high degree of privacy between a communication terminal apparatus such as a PDA with a limited processing capability and a server.

SUMMARY OF THE INVENTION

The present invention has been made in view of the above, and it is accordingly an object of the present invention to establish a low-cost broadband communication channel providing a high degree of privacy between a portable type information terminal apparatus such as a PDA with a limited processing capability and a server.

According to a first aspect of the present invention, there is provided an information processing apparatus for transmitting and receiving data to and from an other information processing apparatus or a portable type information terminal apparatus via an information storing medium, the information processing apparatus including:

first authentication means for being connected to the information storing medium storing data recorded in the portable type information terminal apparatus and performing authentication;

reading means for reading the data stored in the information storing medium when the authentication has been performed by the first authentication means;

second authentication means for being connected to the other information processing apparatus via a network and performing authentication;

encrypting means for encrypting the data read by the reading means when the authentication has been performed by the second authentication means; and transmitting means for transmitting the data encrypted by the encrypting means to the other information processing apparatus via the network.

Preferably, the information processing apparatus further includes decrypting means for decrypting the data with a temporary key generated by the first authentication means.

Preferably, the encrypting means encrypts the data with a temporary key generated by the second authentication means.

Preferably, the data stored in the information storing medium is decrypted with a temporary key generated when the information storing medium and the portable type information terminal apparatus are authenticated, and then stored.

Preferably, the network is a broadband network.

According to a second aspect of the present invention, there is provided an information processing method of an information processing apparatus, the information processing apparatus transmitting and receiving data to and from an other information processing apparatus or a portable type information terminal apparatus via an information storing medium, the information processing method including:

a first authentication step of being connected to the information storing medium storing data recorded in the portable type information terminal apparatus and performing authentication;

a reading control step of controlling reading of the data stored in the information storing medium when the authentication has been performed by the processing of the first authentication step;

a second authentication step of being connected to the other information processing apparatus via a network and performing authentication;

an encrypting step of encrypting the data read in the reading control step when the authentication has been performed by the processing of the second authentication step; and a transmitting step of transmitting the data encrypted by the processing of the encrypting step to the other information processing apparatus via the network.

According to a third aspect of the present invention, there is provided a recording medium having a computer readable program recorded thereon, the program controlling an information processing apparatus for transmitting and receiving data to and from an other information processing apparatus or a portable type information terminal apparatus via an information storing medium, the program including:

a first authentication step of being connected to the information storing medium storing data recorded in the portable type information terminal apparatus and performing authentication;

a reading control step of controlling reading of the data stored in the information storing medium when the authentication has been performed by the processing of the first authentication step;

a second authentication step of being connected to the other information processing apparatus via a network and performing authentication;

an encrypting step of encrypting the data read in the reading control step when the authentication has been performed by the processing of the second authentication step; and a transmitting step of transmitting the data encrypted by the processing of the encrypting step to the other information processing apparatus via the network.

According to a fourth aspect of the present invention, there is provided a program executed by a computer, the computer controlling an information processing apparatus for transmitting and receiving data to and from an other information processing apparatus or a portable type information terminal apparatus via an information storing medium, the program including:

a first authentication step of being connected to the information storing medium storing data recorded in the portable type information terminal apparatus and performing authentication;

a reading control step of controlling reading of the data stored in the information storing medium when the authentication has been performed by the processing of the first authentication step;

a second authentication step of being connected to the other information processing apparatus via a network and performing authentication;

an encrypting step of encrypting the data read in the reading control step when the authentication has been performed by the processing of the second authentication step; and a transmitting step of transmitting the data encrypted by the processing of the encrypting step to the other information processing apparatus via the network.

In the information processing apparatus and method and the program according to the present invention, after being connected to an information storing medium storing data recorded in a portable type information terminal apparatus and performing authentication, the data stored in the information storing medium is read, and after being connected to an other information processing apparatus via a network and performing authentication, the read data is encrypted and the encrypted data is transmitted to the other information processing apparatus via the network.

BRIEF DESCRIPTION OF THE DRAWINGS

FIG. 4 is a diagram showing an example of configuration of a digital data transmission system to which the present invention is applied;

FIG. 9 is a diagram of assistance in explaining a configuration of functions of the digital data transmission system of FIG. 4; and FIG. 10 is a flowchart of assistance in explaining processing for the PDA to transmit data to the data communication server.

DETAILED DESCRIPTION OF THE PREFERRED EMBODIMENT

A preferred embodiment of the present invention will hereinafter be described with reference to the drawings.

Figure 1:
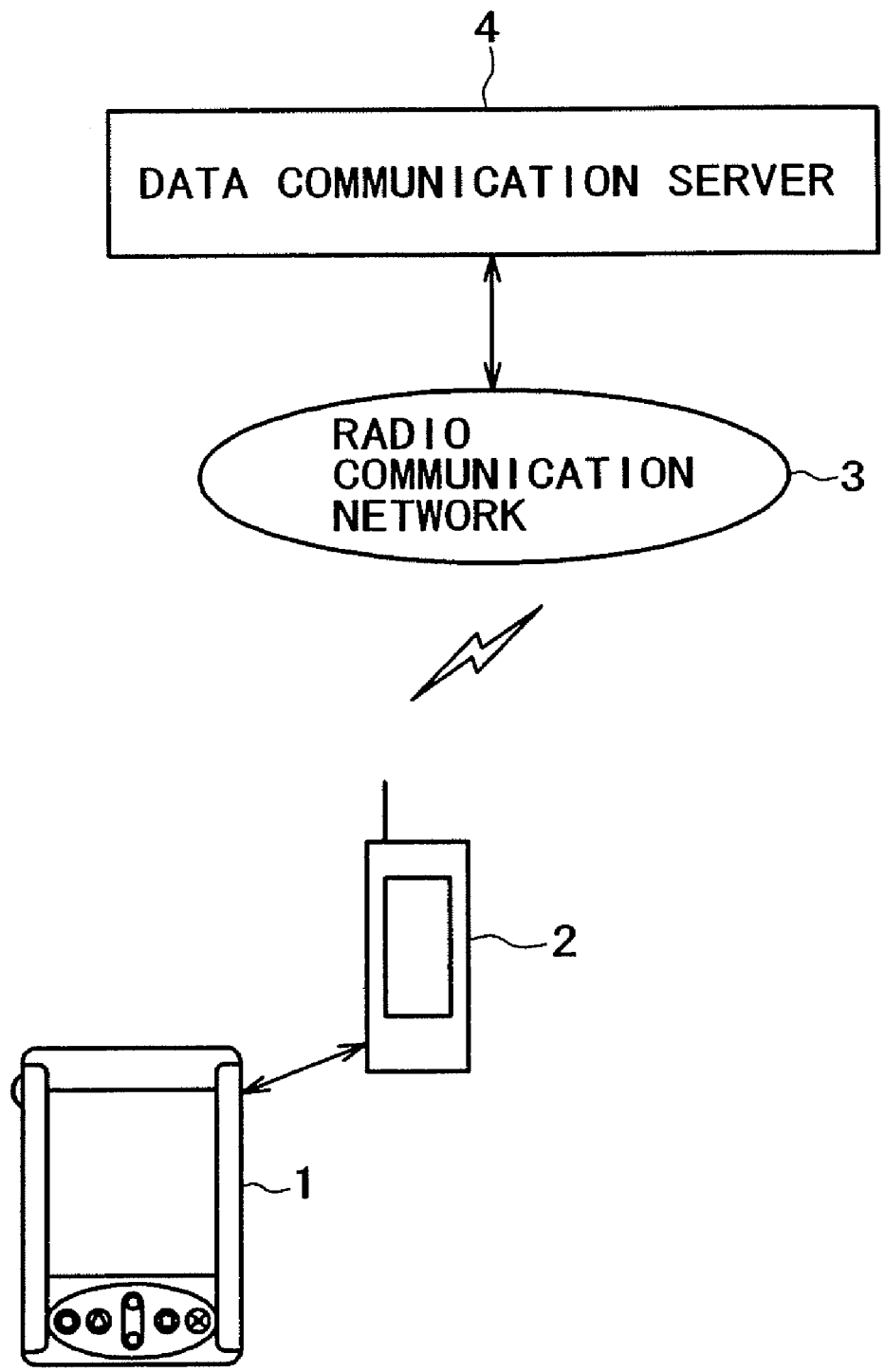
FIG. 1 is a diagram showing an example of configuration of a related-art digital data communication system.

FIG. 4 is a diagram showing an example of configuration of a digital data transmission system to which the present invention is applied. Incidentally, parts corresponding to those in FIG. 1 are identified by the same reference numerals, and description of the parts will be omitted where appropriate. In this digital data communication system, a broadband network 53 is connected with a personal computer 52 and a data communication server 4.

A memory card 51 formed by a flash memory can be inserted into and detached from a PDA 1 and the personal computer 52. For example, when data is to be transmitted from the PDA 1 to the data communication server 4, a user inserts the memory card 51 into the PDA 1, and records the data therein. The user extracts the memory card 51 from the PDA 1, and then inserts the memory card 51 into the personal computer 52 so that the personal computer 52 reads the data recorded in the memory card 51. Then, the personal computer 52 having a high processing capability is connected to the data communication server 4 via the broadband network 53, and is thereby able to transmit the data read from the memory card 51.

The memory card 51 in the present invention has a function of protecting data and protecting conditions for use. Specifically, the memory card 51 has a cryptographic processing module 172 (FIG. 9) for encrypting or decrypting data so as to prevent interception and falsification of data and the like. The conditions for use include conditions for data reproduction, copy, move, storage and the like. The conditions for use are added to encrypted data and then stored.

Figure 5:
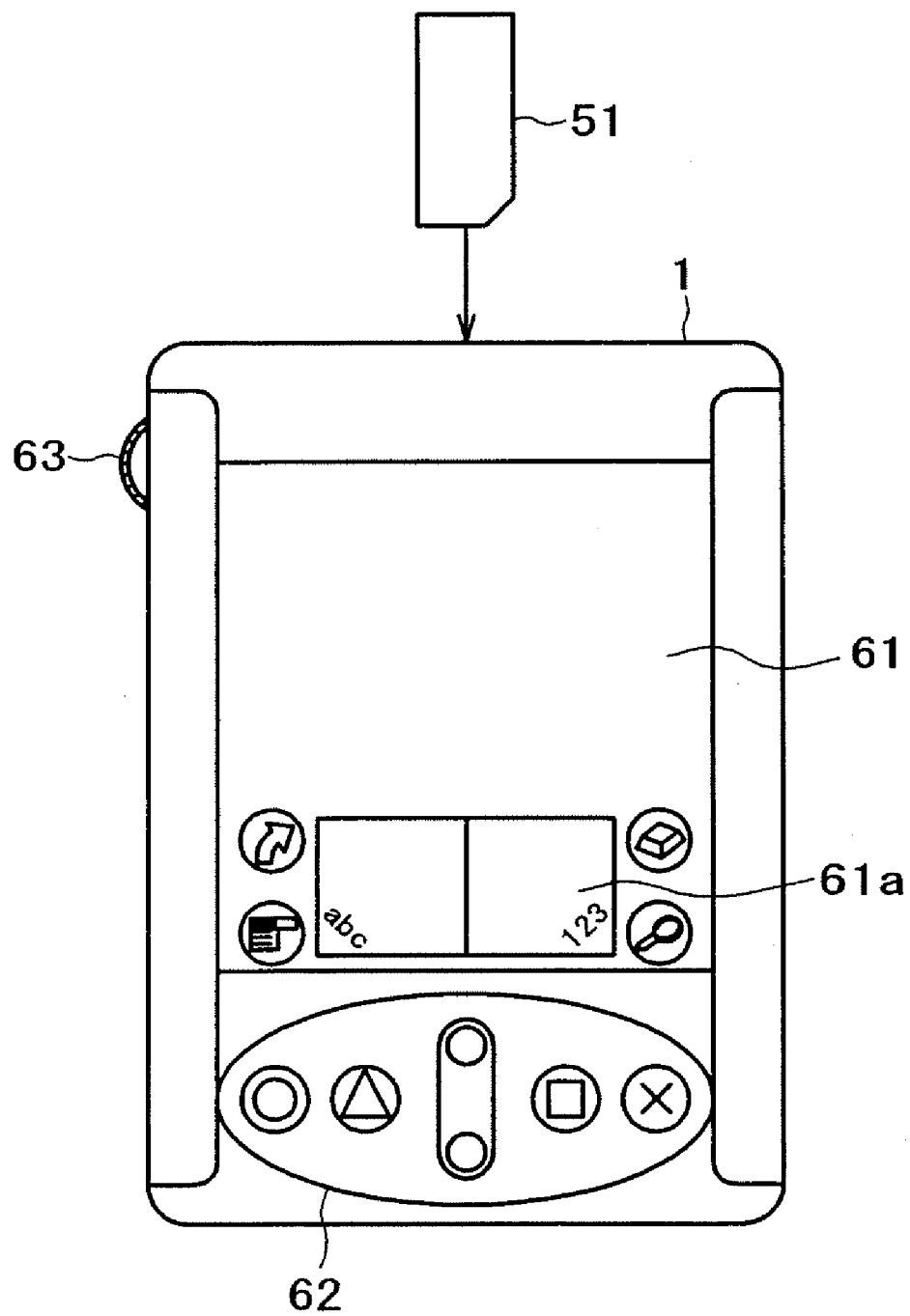
FIG. 5 is a view of an example of external configuration of a PDA in FIG. 4.

FIG. 5 is a view of an example of external configuration of the PDA 1 in FIG. 4.

A housing of the PDA 1 is formed to be of a size such that the PDA 1 can be held and operated by one hand. The PDA 1 is provided at a top portion thereof with a not shown memory card slot into which the memory card 51 is inserted and an infrared communication unit 80 (FIG. 6) for exchanging information with an other apparatus using infrared communication. In addition, a wireless LAN (not shown) or the like may be provided for wireless communication by Bluetooth (trademark).

The memory card 51 shown in FIG. 5 is for example a flash memory card developed by the present assignee and referred to as a Memory Stick (trademark). The Memory Stick is formed by housing a flash memory element, which is a kind of EEPROM (Electrically Erasable Programmable Read-Only Memory), or an electrically rewritable and erasable nonvolatile memory, in a plastic case of a small thin shape 50 mm long by 21.5 mm wide by 2.8 mm thick. Various data of images, voice, music and the like can be written to and read from the Memory Stick via a 10-pin terminal.

Further, the Memory Stick uses an original serial protocol that can ensure compatibility with apparatus being used even when there is a change in specifications of the included flash memory due to an increase in capacity or the like, realizes a high-speed performance at a maximum writing speed of 1.5 MB/S and a maximum reading speed of 2.45 MB/S, and has an accidental erasure prevention switch for preventing accidental erasing of data recorded in the Memory Stick to thereby ensure high reliability.

Returning to FIG. 5, the PDA 1 is provided on an under side thereof with a modem not shown in the figure for connection to a public line network, a USB (Universal Serial Bus) port or an RS-232C port (both not shown) for exchanging various data, and the like. The PDA 1 is also provided with a display unit 61, a key group 62, a jog dial 63 and the like.

The display unit 61 is formed by a thin display device such as a liquid crystal display apparatus, and displays images such as icons, thumbnails, text or the like. The display unit 61 is provided on a lower side thereof with a touch pad 61a. A user presses the display unit 61 and the touch pad 61a with a finger, a pen or the like to thereby input predetermined data or operation instructions to a CPU (Central Processing Unit) 71 (FIG. 6) of the PDA 1.

The key group 62 is operated by the user when inputting predetermined data or operation instructions to the CPU 71. When the key group 62 is operated by the user, the CPU 71 starts a schedule, an address book, a memo pad or the like or scrolls a screen.

When an icon, a thumbnail, text or the like displayed on the display unit 61 is selected by the user, for example, the jog dial 63 is rotated or pressed toward the body of the PDA 1. For example, when the jog dial 63 is rotated in a state in which a plurality of icons are displayed on the display unit 61, a desired icon is selected from the plurality of icons, and when the jog dial 63 is pressed toward the body of the PDA 1, the selection of the icon is confirmed. When the icon whose selection has been confirmed corresponds to an application program, the application program is started.

Also, an operation of rotating the jog dial 63 while pressing the jog dial 63 toward the body may be set to correspond to an instruction different from that of the normal rotating operation. The operations of the jog dial 63 and instructions corresponding to the operations are not limited to these.

Figure 6:
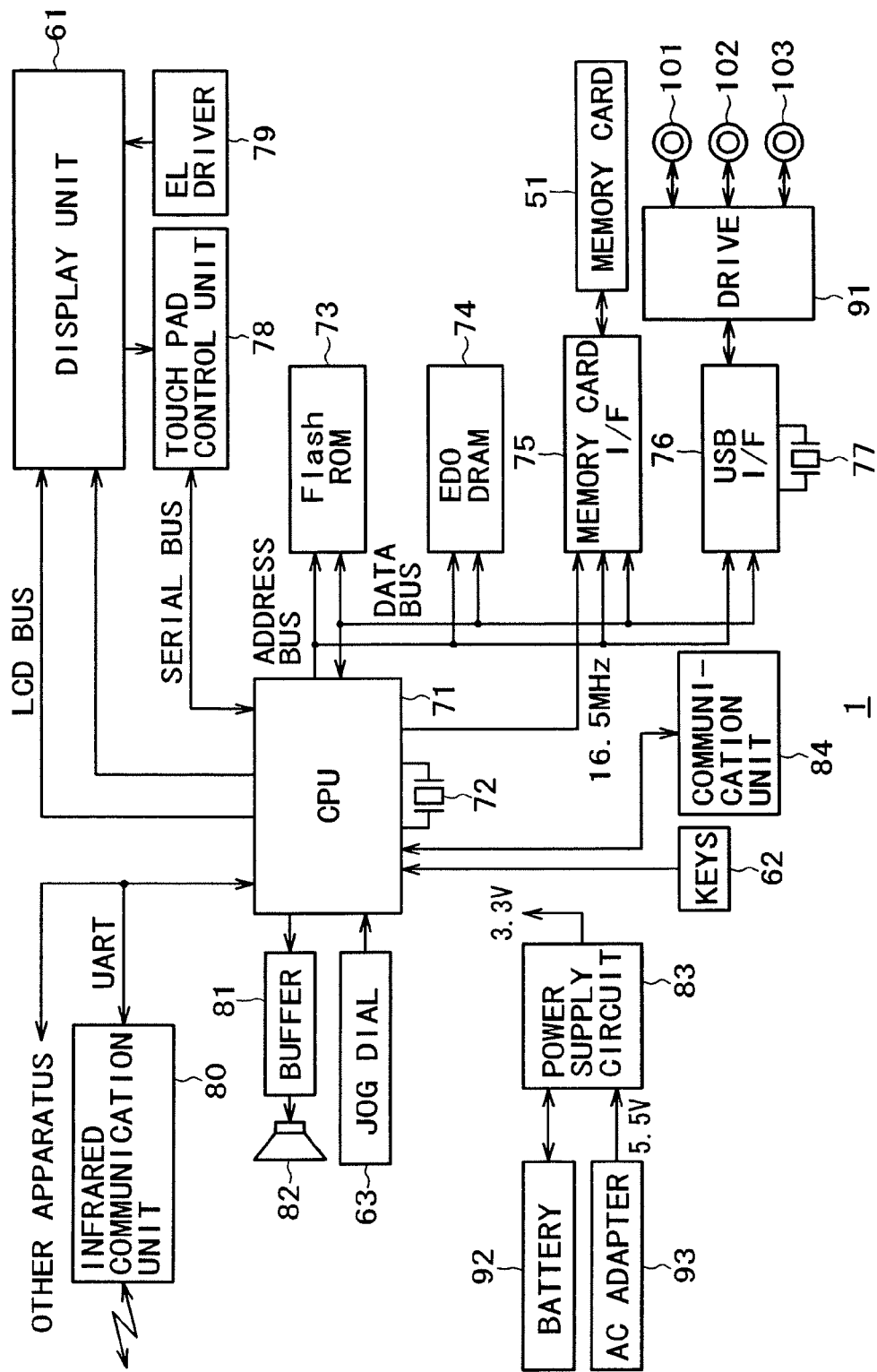
FIG. 6 is a block diagram showing an example of electrical configuration of the PDA in FIG. 4.

FIG. 6 is a block diagram showing an example of electrical configuration of the PDA 1.

The CPU 71 executes an operating system, an application program, or various other programs stored in a Flash ROM (Read-Only Memory) 73 or an EDO DRAM (Extended Data Out Dynamic Random-Access Memory) 74 in synchronism with a clock signal supplied from an oscillator 72.

The Flash ROM 73 is formed by a flash memory, a kind of EEPROM, and generally stores programs to be used by the CPU 71 and basically fixed data among parameters for computation. The EDO DRAM 74 stores programs being executed by the CPU 71 and parameters that are changed as required in the execution of the programs.

A memory card interface (I/F) 75 reads data from the memory card 51 inserted in the PDA 1 and writes data supplied from the CPU 71 to the memory card 51 as required.

A USB interface 76 in synchronism with a clock signal supplied from an oscillator 77 inputs data or a program from a drive 91, which is a USB device, and supplies data from the CPU 71 to the drive 91.

The drive 91 reads data or a program recorded on a magnetic disc 101, an optical disc 102, or a magneto-optical disc 103 inserted as required, and then supplies the data or program to the CPU 71 or the EDO DRAM 74 via the USB interface 76. The drive 91 also records data or a program onto the magnetic disc 101, the optical disc 102, or the magneto-optical disc 103 being inserted.

The Flash ROM 73, the EDO DRAM 74, the memory card interface 75, and the USB interface 76 are connected to the CPU 71 via an address bus and a data bus.

The display unit 61 receives data from the CPU 71 via an LCD bus, and then displays an image, a character or the like corresponding to the received data. When the display unit 61 or the touch pad 61a is operated, a touch pad control unit 78 receives data corresponding to the operation (for example indicating coordinates touched) from the display unit 61 or the touch pad 61a, and supplies a signal corresponding to the received data to the CPU 71 via a serial bus.

An EL (electroluminescence) driver 79 operates electroluminescence elements provided on a backside of a liquid crystal display unit of the display unit 61, and controls display brightness of the display unit 61.

The infrared communication unit 80 transmits data received from the CPU 71 as an infrared signal to an other apparatus not shown in the figure via a UART (Universal Asynchronous Receiver-Transmitter), and also receives an infrared signal transmitted from an other apparatus and supplies the infrared signal to the CPU 71. The PDA 1 can also communicate with an other apparatus via the UART.

An audio reproducing unit 82 is formed by an audio data decoding circuit or the like. The audio reproducing unit 82 decodes audio data stored in advance, audio data received from an other apparatus or the like, and then outputs audio. For example, the audio reproducing unit 82 decodes audio data supplied from the CPU 71 via a buffer 81, and then outputs corresponding audio to headphones not shown in the figure.

A power supply circuit 83 converts voltage of power supplied from a battery 92 inserted in the PDA 1 or an AC (Alternating Current) adapter 93 connected to the PDA 1, and then supplies necessary power to each of the CPU 71 to the audio reproducing unit 82.

A communication unit 84 is an RS-232C interface, for example, and is connected to a communication module or the like. The communication unit 84 is connected to the Internet or the like via the communication module. The communication unit 84 stores data (for example electronic mail) supplied from the CPU 71 in packets of a predetermined system and then transmits the packets to an other apparatus via the Internet. Also, the communication unit 84 outputs to the CPU 71 data or a program stored in packets received from an other apparatus via the Internet.

Figure 7:
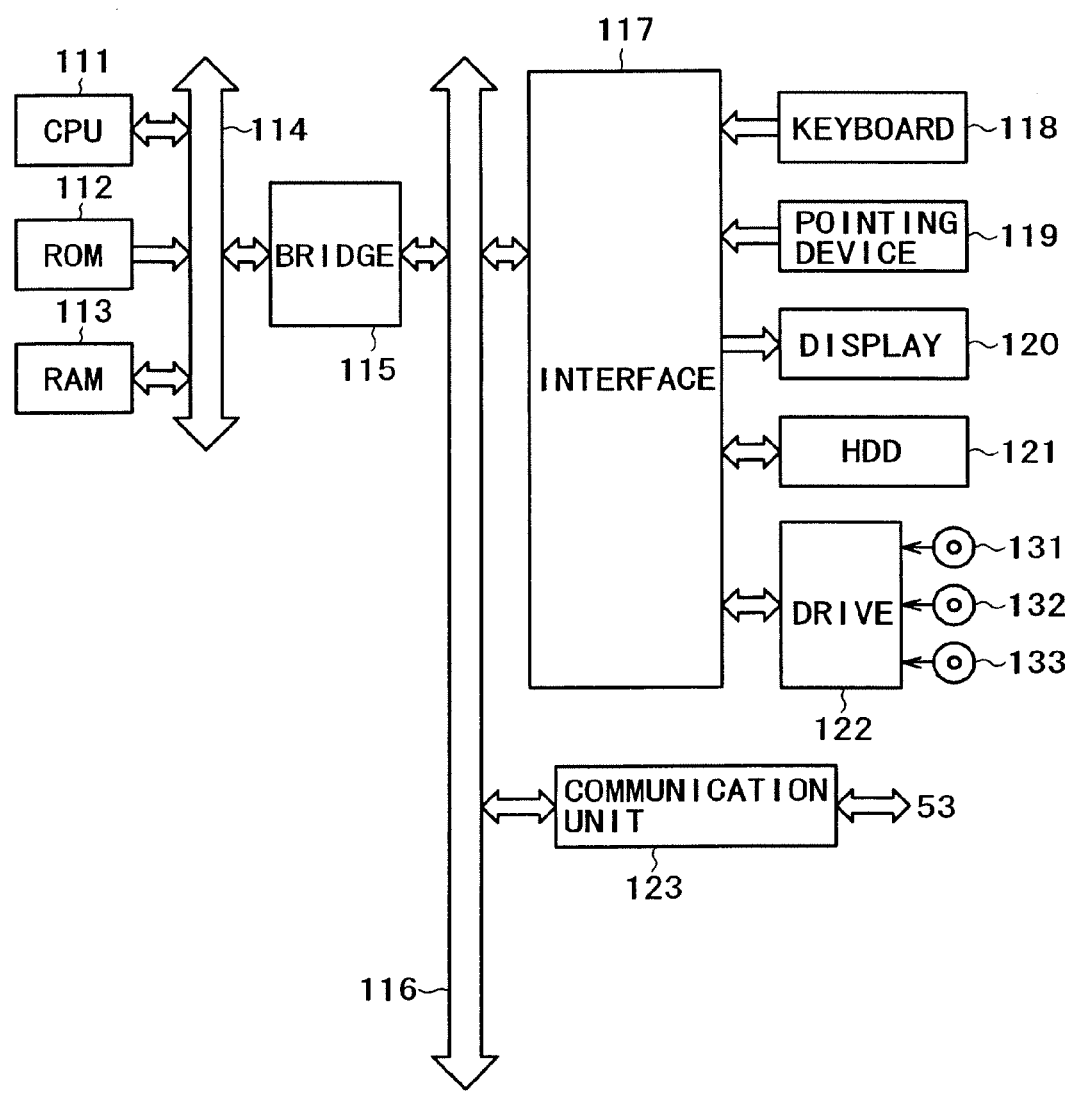
FIG. 7 is a block diagram showing an example of configuration of a data communication server in FIG. 4.

FIG. 7 is a block diagram showing an example of configuration of the data communication server 4 in FIG. 4.

A CPU 111 actually executes various application programs and an OS (Operating System). A ROM (Read-Only Memory) 112 generally stores programs to be used by the CPU 111 and basically fixed data among parameters for computation. A RAM (Random-Access Memory) 113 stores programs used in the execution by the CPU 111 and parameters that are changed as required in the execution. These units are interconnected by a host bus 114 formed by a CPU bus or the like.

The host bus 114 is connected to an external bus 116 such as a PCI (Peripheral Component Interconnect/Interface) bus or the like via a bridge 115.

A keyboard 118 is operated by a user when inputting various instructions to the CPU 111. A pointing device 119 is operated by the user when specifying or selecting a point on a screen of a display 120. The display 120 is formed by a liquid crystal display apparatus or the like, and displays various information in the form of text and images. A hard disc drive (HDD) 121 drives hard discs to allow the hard discs to record or reproduce information or a program to be executed by the CPU 111.

A drive 122 reads data or a program (including a program to be executed by a communication unit 123) recorded on a magnetic disc 131, an optical disc 132, or a magneto-optical disc 133 inserted therein. The drive 122 then supplies the data or program to the RAM 113 connected thereto via an interface 117, the external bus 116, the bridge 115, and the host bus 114, or to the communication unit 123 connected thereto via the interface 117 and the external bus 116. The keyboard 118 to the drive 122 are connected to the interface 117, and the interface 117 is connected to the CPU 111 via the external bus 116, the bridge 115, and the host bus 114.

The communication unit 123 communicates with the personal computer 52 via the broadband network 53. The communication unit 123 stores data supplied from the CPU 111 or the hard disc drive 121 in packets of a predetermined system and then transmits the packets to the personal computer 52.

Also, the communication unit 123 outputs data stored in packets received from the personal computer 52 to the CPU 111, the RAM 113, or the hard disc drive 121.

The communication unit 123 is connected to the CPU 111 via the external bus 116, the bridge 115, and the host bus 114.

Figure 8:
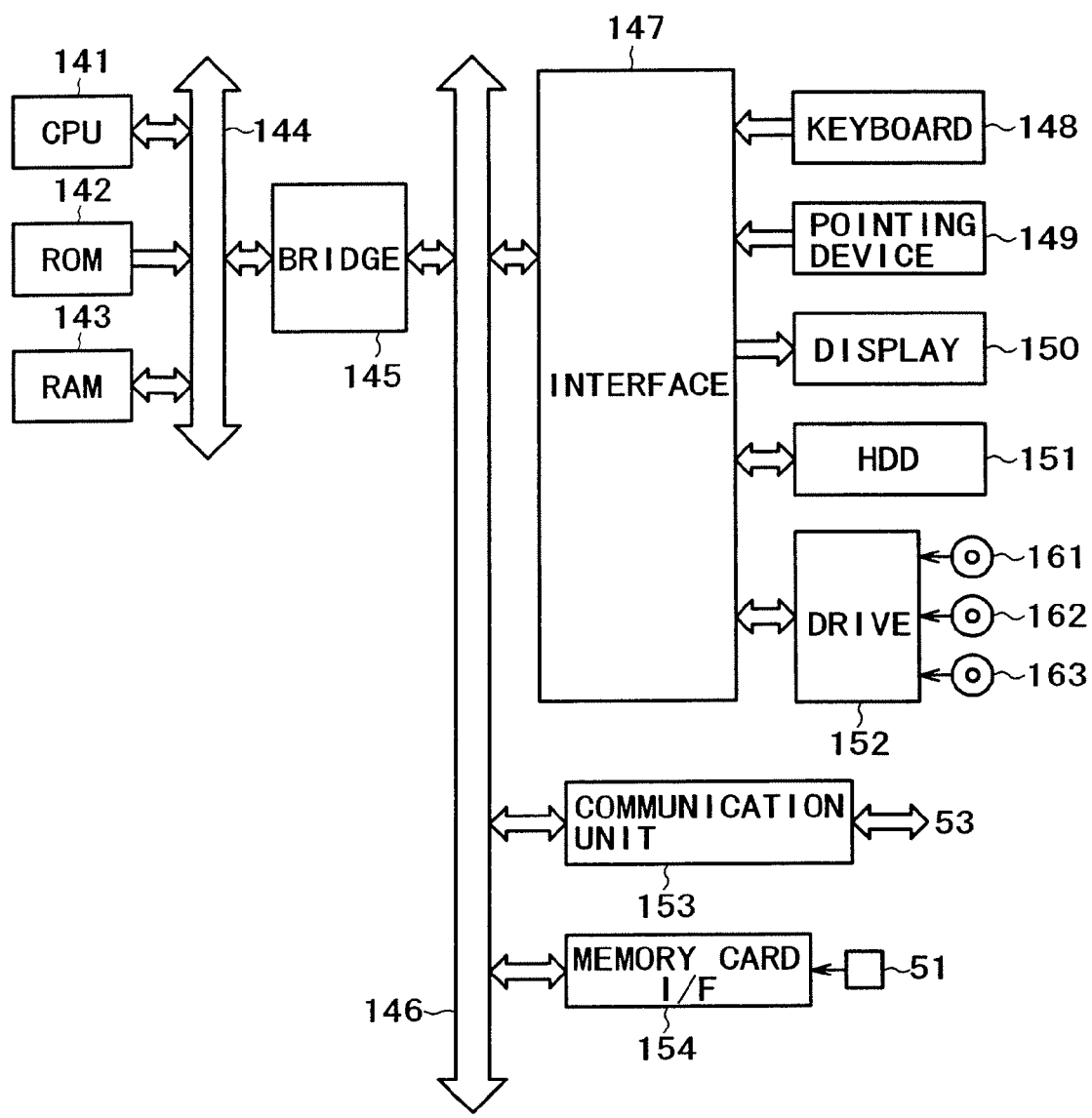
FIG. 8 is a block diagram showing an example of configuration of a personal computer in FIG. 4.

FIG. 8 is a block diagram showing an example of configuration of the personal computer 52 in FIG. 4. Incidentally, except that a memory card interface (I/F) 154 is newly provided, the example of configuration of the personal computer 52 is the same as that of the data communication server 4 described above with reference to FIG. 7, and therefore its description will be omitted.

The memory card interface 154 writes data supplied from a CPU 141 to the memory card 51, and reads data recorded in the memory card 51 and supplies the data to the CPU 141 via an external bus 146, a bridge 145, and a host bus 144.

Figure 2:
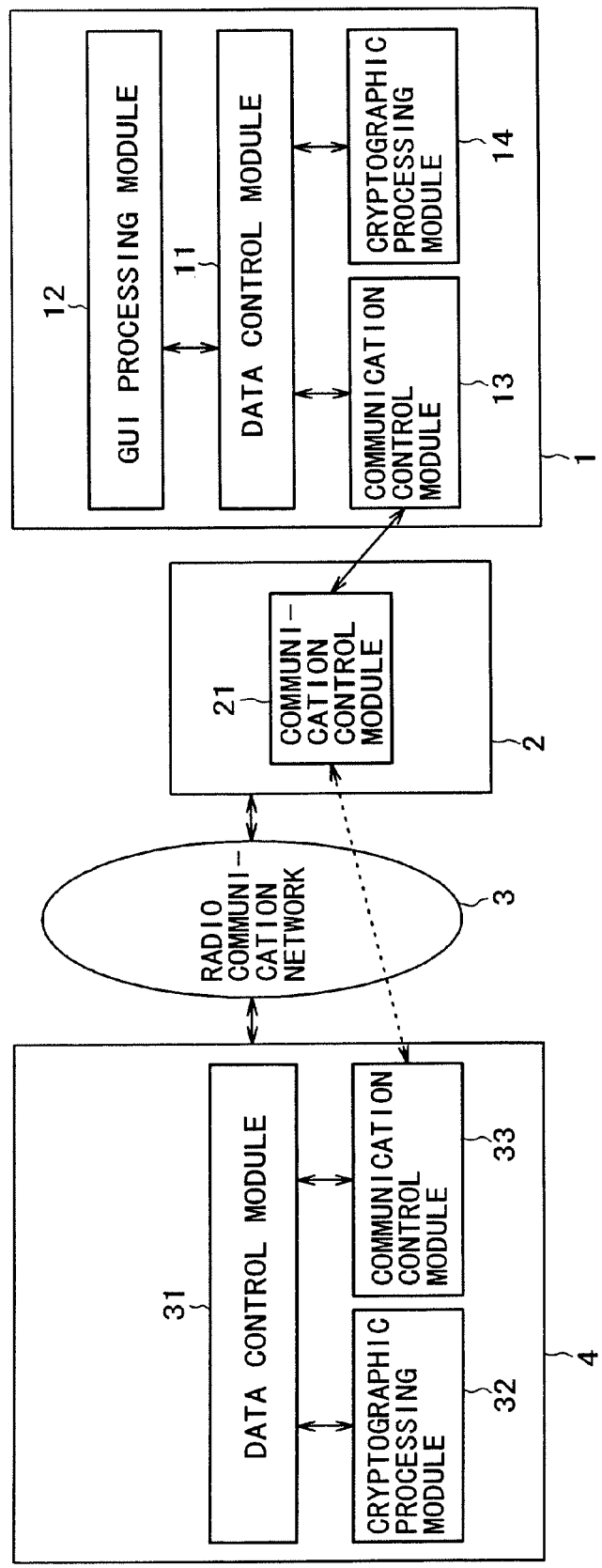
FIG. 2 is a diagram of assistance in explaining a configuration of functions of the digital data transmission system of FIG. 1.
Figure 3:
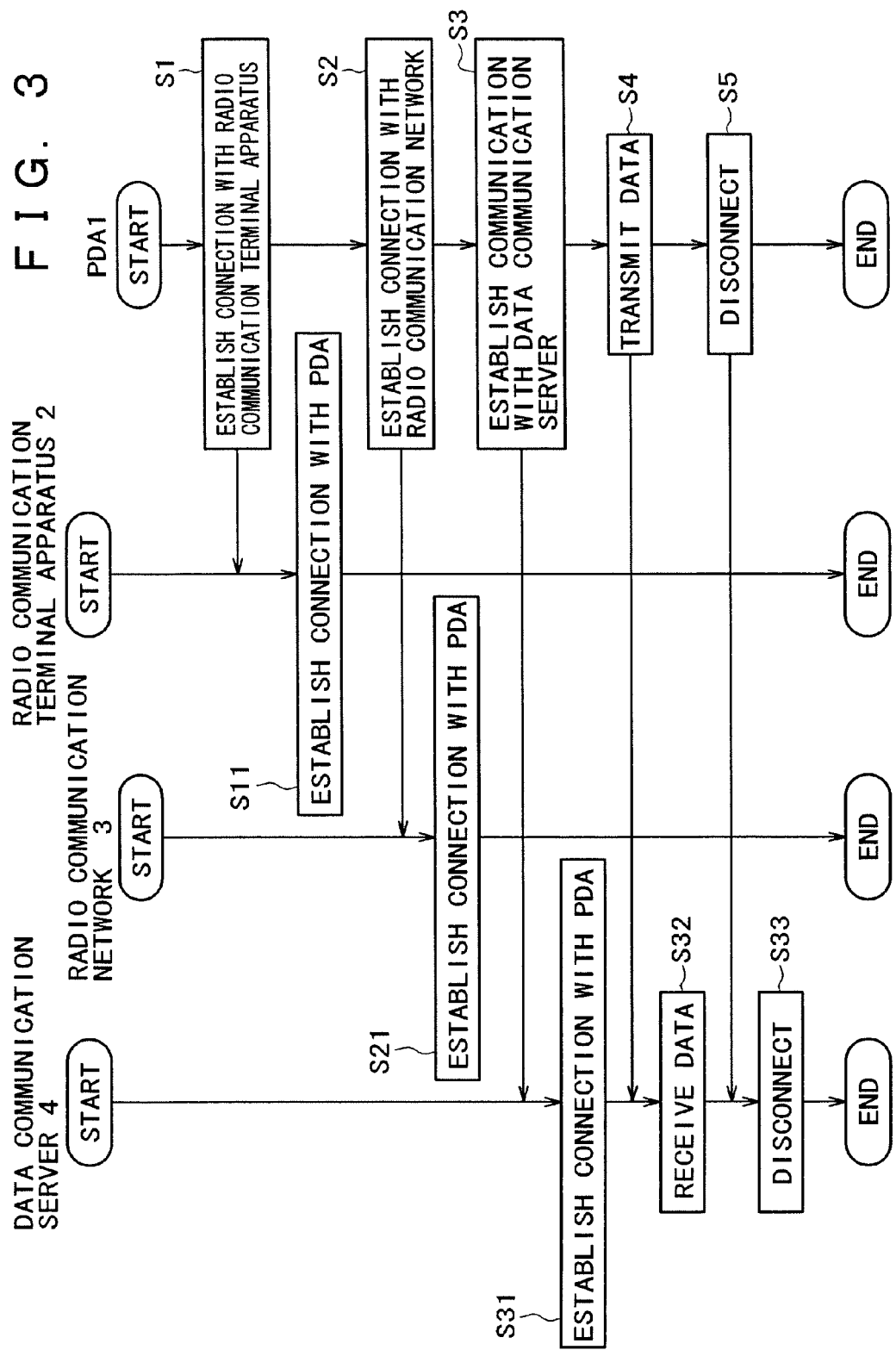
FIG. 3 is a flowchart of assistance in explaining related-art processing for a PDA to transmit data to a data communication server.

A configuration of functions (modules) of the digital data transmission system of FIG. 4 will next be described with reference to FIG. 9. Incidentally, parts corresponding to those in FIG. 2 are identified by the same reference numerals, and description of the parts will be omitted where appropriate.

A memory card interface processing module 161 under control of a data control module 11 is connected to a memory card interface processing module 171 of the memory card 51, and writes necessary data thereto. Also, under control of the data control module 11, the memory card interface processing module 161 is connected to the memory card interface processing module 171 of the memory card 51, reads data written in the memory card 51, and supplies the data to the data control module 11.

The memory card interface processing module 171 of the memory card 51 is connected to the memory card interface processing module 161 of the PDA 1 or a memory card interface processing module 185 of the personal computer 52. A cryptographic processing module 172 decrypts data supplied thereto via the memory card interface processing module 171, or encrypts data recorded within the memory card 51 and supplies the encrypted data to the PDA 1 or the personal computer 52 via the memory card interface processing module 171.

A data control module 181 of the personal computer 52 controls data communication of a communication control module 183 or the memory card interface processing module 185 on the basis of an input signal from a GUI processing module 182. The data control module 181 also controls data encryption or decryption processing of a cryptographic processing module 184 on the basis of an input signal from the GUI processing module 182.

When a user operates a GUI using a keyboard 148 or a pointing device 149, the GUI processing module 182 supplies the data control module 181 with an input signal for connection to the data communication server 4. Under control of the data control module 181, the communication control module 183 is connected to a communication control module 33 of the data communication server 4 via the broadband network 53.

The cryptographic processing module 184 encrypts or decrypts data under control of the data control module 181. Under control of the data control module 181, the memory card interface processing module 185 is connected to the memory card interface processing module 171 of the memory card 51, and writes necessary data thereto. Also, under control of the data control module 181, the memory card interface processing module 185 reads data written in the memory card 51, and supplies the data to the data control module 181.

A method of encryption performed by a cryptographic processing module 14 of the PDA 1, the cryptographic processing module 172 of the memory card 51, the cryptographic processing module 184 of the personal computer 52, or a cryptographic processing module 32 of the data communication server 4 is for example DES (Data Encryption Standard) or the like.

Processing of recording data recorded in the PDA 1 into the memory card 51, reading the data from the memory card 51 by the personal computer 52 having the memory card 51 inserted therein, and transmitting the data to the data communication server 4 will next be described with reference to a flowchart of FIG. 10.

First, a user inserts the memory card 51 into the PDA 1, and performs GUI operation for storing data therein by using the touch pad 61*a*, the key group 62, or the jog dial 63.

At a step S51, on the basis of an input signal (signal corresponding to an operation for being connected to the memory card 51 and storing data therein) supplied from a GUI processing module 12, the data control module 11 of the PDA 1 controls interface processing of the memory card interface processing module 161. Under control of the data control module 11, the memory card interface processing module 161 establishes connection with the memory card interface processing module 171 of the memory card 51. At a step S61, the memory card interface processing module 171 of the memory card 51 establishes connection with the memory card interface processing module 161 of the PDA 1.

After establishing connection between the PDA 1 and the memory card 51, the PDA 1 and the memory card 51 authenticate each other at a step S52 and a step S62. As the mutual authentication processing, there is a challenge response method or other authentication processing. In the challenge response method, the memory card 51 responds to a value (challenge) generated by the PDA 1 with a value (response) generated by the memory card 51 by using a secret key shared with the PDA 1. Then the PDA 1 and the memory card 51 each generate a temporary key from the response by the same computation, and share the temporary key.

At a step S53, the data control module 11 of the PDA 1 makes the cryptographic processing module 14 encrypt data with the shared temporary key generated by the authentication processing. The data control module 11 then transfers the data encrypted by the cryptographic processing module 14 to the memory card 51 via the memory card interface processing module 161. At a step S63, the memory card interface processing module 171 of the memory card 51 supplies the data from the PDA 1 to the cryptographic processing module 172. The cryptographic processing module 172 decrypts the data obtained from the PDA 1 via the memory card interface processing module 171 with the shared temporary key generated by the authentication processing, and then stores the decrypted data in the memory card 51.

At a step S54, the memory card interface processing module 161 of the PDA 1 is disconnected from the memory card 51. At a step S64, the memory card interface processing module 171 of the memory card 51 is disconnected from the PDA 1.

As a result of the above processing, the data recorded in the PDA 1 is encrypted by the cryptographic processing module 14 and then transferred to the memory card 51, and thereafter the data is decrypted by the cryptographic processing module 172 of the memory card 51 and then stored. It is thereby possible to prevent interception and falsification of data and the like.

Then, the user extracts the memory card 51 inserted in the PDA 1, inserts the memory card 51 into the personal computer 52, and performs a GUI operation for reading the data stored in the memory card 51 by using the keyboard 148 or the pointing device 149.

At a step S81, on the basis of an input signal (signal corresponding to an operation for being connected to the memory card 51 and reading data stored therein) supplied from the GUI processing module 182, the data control module 181 of the personal computer 52 controls interface processing of the memory card interface processing module 185. Under control of the data control module 181, the memory card interface processing module 185 establishes connection with the memory card interface processing module 171 of the memory card 51. At a step S65, the memory card interface processing module 171 of the memory card 51 establishes connection with the memory card interface processing module 185 of the personal computer 52.

After establishing connection between the personal computer 52 and the memory card 51, the personal computer 52 and the memory card 51 authenticate each other at a step S82 and a step S66. The personal computer 52 and the memory card 51 generate a temporary key by authentication processing such as the challenge response method as described above, and share the temporary key.

At a step S83, the data control module 181 of the personal computer 52 reads the data from the memory card 51 via the memory card interface processing module 185. At a step S67, the cryptographic processing module 172 of the memory card 51 encrypts the data with the shared temporary key generated by the authentication processing, and then transfers the encrypted data to the personal computer 52 via the memory card interface processing module 171. The cryptographic processing module 184 of the personal computer 52 decrypts the data with the shared temporary key generated by the authentication processing, and then stores the decrypted data in a hard disc drive 151.

As a result of the above processing, the data stored in the memory card 51 is encrypted by the cryptographic processing module 172 and then read by the personal computer 52, and thereafter the data is decrypted by the cryptographic processing module 184 of the personal computer 52 and then stored in the hard disc drive 151. It is thereby possible to prevent interception and falsification of data and the like.

Then, the user uses the keyboard 148 or the pointing device 149 of the personal computer 52 to be connected to the data communication server 4 and perform GUI operation for transmission of the data.

At a step S84, on the basis of an input signal (signal corresponding to an operation for being connected to the data communication server 4 and transmitting data) supplied from the GUI processing module 182, the data control module 181 of the personal computer 52 controls data communication of the communication control module 183. Under control of the data control module 181, the communication control module 183 establishes connection with the broadband network 53. At a step S101, a base station not shown of the broadband network 53 establishes connection with the communication control module 183 of the personal computer 52.

At a step S85, the communication control module 183 of the personal computer 52 establishes communication with the communication control module 33 of the data communication server 4 via the broadband network 53. At a step S111, under control of a data control module 31, the communication control module 33 of the data communication server 4 establishes communication with the communication control module 183 of the personal computer 52 via the broadband network 53.

After establishing communication between the data communication server 4 and the personal computer 52, the personal computer 52 and the data communication server 4 authenticate each other at a step S86 and a step S112.

A master key KMS is stored in advance in the data communication server 4, and an individual key KPP and an ID of the personal computer 52 are stored in advance in the personal computer 52. Also, a master key KMP is stored in advance in the personal computer 52, and an individual key KPS and an ID of the data communication server 4 are stored in the data communication server 4.

The data communication server 4 receives the ID of the personal computer 52 supplied from the personal computer 52, applies a hash function to the ID and the master key KMS possessed by the data communication server 4 itself, and thereby generates the same key as the individual key KPP of the personal computer 52. The personal computer 52 receives the ID of the data communication server 4 supplied from the data communication server 4, applies a hash function to the ID and the master key KMP possessed by the personal computer 52 itself, and thereby generates the same key as the individual key KPS of the data communication server 4.

Thus, the common individual keys are shared by both the data communication server 4 and the personal computer 52. The data communication server 4 and the personal computer 52 further generate a temporary key using the individual keys.

At a step S87, the data control module 181 of the personal computer 52 makes the cryptographic processing module 184 encrypt the data with the shared temporary key generated by the authentication processing. The data control module 181 then transmits the data encrypted by the cryptographic processing module 184 to the data communication server 4 via the communication control module 183 and the broadband network 53.

At a step S113, the data control module 31 of the data communication server 4 receives the data transmitted via the communication control module 33 and the broadband network 53, and then supplies the data to the cryptographic processing module 32. The cryptographic processing module 32 decrypts the data with the shared temporary key generated by the authentication processing.

At a step S88, the communication control module 183 of the personal computer 52 is disconnected from the data communication server 4. At a step S114, the communication control module 33 of the data communication server 4 is disconnected from the personal computer 52.

As a result of the above processing, the data obtained from the PDA 1 via the memory card 51 and stored in the hard disc drive 151 of the personal computer 52 is encrypted by the cryptographic processing module 184, and then transmitted to the data communication server 4 via the broadband network 53. Thereafter the encrypted data received by the data communication server 4 is decrypted by the cryptographic processing module 32 of the data communication server 4. It is thereby possible to prevent interception and falsification of data and the like.

Thus, the mutual authentication processing is performed between the PDA 1 and the memory card 51, between the memory card 51 and the personal computer 52, and between the personal computer 52 and the data communication server 4. It is thereby possible to prevent interception and falsification of data and the like. Consequently, a communication channel providing a high degree of privacy can be established between the PDA 1 and the data communication server 4.

When an amount of data to be communicated is small, for example, the communication channel of the broadband network 53 and the like providing a high degree of privacy does not necessarily need to be used; the data may of course be exchanged by radio communication. Hence, the user can choose the communication channel of the broadband network 53 and the like providing a high degree of privacy according to the amount of data to be communicated and conditions of a communication channel in the case of radio communication.

Further, while in the present invention, description has been made of an example in which the broadband network 53 is used for data communication, the present invention is not limited to this, and for example satellite communication, wireless communication, narrow-band communication, a LAN (Local Area Network) or the like may be used.

Further, while in the present invention, description has been made of an example in which data recorded in the PDA 1 is transmitted to the data communication server 4 via the memory card 51, the personal computer 52, and the broadband network 53, a similar communication channel providing a high degree of privacy can of course be established also when data transmitted from the data communication server 4 is received by the PDA 1.

Specifically, the personal computer 52 is first connected to the data communication server 4. After mutual authentication processing, the personal computer 52 generates a temporary key by the authentication and shares the temporary key with the data communication server 4, and requests transmission of desired data. The data communication server 4 thereby encrypts the data with the shared temporary key generated by the authentication, and then transmits the encrypted data to the personal computer 52 via the broadband network 53. Next, the personal computer 52 is connected to the memory card 51, performs mutual authentication processing, generates a temporary key and shares the temporary key with the memory card 51. Then the personal computer 52 encrypts the data obtained from the data communication server 4 with the shared temporary key generated by the authentication, and stores the data in the memory card 51. Further, the memory card 51 having the data stored therein is connected to the PDA 1, performs mutual authentication processing, generates a temporary key and shares the temporary key with the PDA 1. The PDA 1 reads the data from the memory card 51, and then decrypts the data with the shared temporary key generated by the authentication.

Thus, the mutual authentication processing is performed between the personal computer 52 and the data communication server 4, between the personal computer 52 and the memory card 51, and between the memory card 51 and the PDA 1. It is thereby possible to prevent interception and falsification of data and the like. Consequently, a communication channel providing a high degree of privacy can be established in both data transmission and data reception between the PDA 1 and the data communication server 4.

While in the above, description has been made of an example in which the memory card 51 having a function of protecting data and protecting conditions for use is used for data exchange between the PDA 1 and the personal computer 52, the present invention is not limited to this, and is widely applicable to other recording medium having a function of protecting data and protecting conditions for use.

Further, even a PDA 1 and a personal computer 52 into which the memory card 51 cannot be directly inserted can read and write data via the memory card 51 inserted in a drive that is USB-connected via a USB port or the like.

The series of processing steps described above can be carried out not only by hardware but also by software. When the series of processing steps is to be carried out by software, a program comprising the software is installed from a program storing medium onto a computer that is incorporated in special hardware, or for example a general-purpose personal computer that can perform various functions by installing various programs thereon.

As shown in FIG. 6, FIG. 7, or FIG. 8, the program storing medium storing the program that is installed on the computer and executable by the computer is formed by packaged media comprising the magnetic disc 101, 131, or 161 (including flexible discs), the optical disc 102, 132, or 162 (including CD-ROM (Compact Disc-Read Only Memory) and DVD (Digital Versatile Disc)), the magneto-optical disc 103, 133, or 163 (including MD (MiniDisc) (trademark)), the memory card 51 or the like, or formed by the Flash ROM 73, the ROM 112, or the ROM 142, the hard disc drive 121 or 151 or the like, which stores the program temporarily or permanently. The program is stored onto the program storing medium via the interface of the communication unit 84, 123, or 153 or the like such as a router or a modem, using a wire communication medium such as a public line network, a local area network, the Internet, or the broadband network 53, or a wireless communication medium such as digital satellite broadcasting, as required.

It is to be noted that in the present specification, the steps describing the program stored on the program storing medium include not only processing carried out in time series in the described order but also processing carried out in parallel or individually and not necessarily in time series.

Also, in the present specification, a system refers to an apparatus as a whole formed by a plurality of apparatus.

In the information processing apparatus and method and the program according to the present invention, after being connected to an information storing medium storing data recorded in a portable type information terminal apparatus and performing authentication, the data stored in the information storing medium is read, and after being connected to an other information processing apparatus via a network and performing authentication, the read data is encrypted and the encrypted data is transmitted to the other information processing apparatus via the network. Therefore, a low-cost broadband communication channel providing a high degree of privacy can be established between a communication terminal apparatus such as a PDA with a limited processing capability and a server.

What is claimed is:

1. An information processing apparatus for transmitting and receiving data to and from an other information processing apparatus or a portable type information terminal apparatus via an information storing medium, said information processing apparatus comprising:
   a communicating unit configured to communicate with said other information processing apparatus via a network and receive said data from said other information processing apparatus;
   an authentication unit including
      a first authentication unit configured to authenticate said other information processing apparatus, and
      a second authentication unit configured to authenticate said information storing medium;
   a memory unit configured to store said data when said other information processing apparatus has been authenticated by said first authentication unit;
   a connecting unit configured to connect with said information storing medium which is configured to store data for recording to said portable type information terminal apparatus;

an encryption unit configured to encrypt said data when said information storing medium has been authenticated by said second authentication unit;

a recorder unit configured to record encrypted data to said information storing medium when the information storing medium has been authenticated by said second authentication unit.

2. An information processing apparatus of claim 1, further comprising:

a decryption unit configured to decrypt said data with a temporary key generated by said authentication unit;

wherein received data from said other information processing apparatus is encrypted, and said received data is decrypted by said decryption unit.

3. An information processing apparatus of claim 1, wherein said encryption unit encrypts said data with a temporary key generated by said authentication unit.

4. An information processing apparatus for transmitting and receiving data to and from an other information processing apparatus or a portable type information terminal apparatus via an information storing medium, the information storing medium storing data for recording to said portable type information terminal apparatus, said information processing apparatus comprising:

means for communicating with said other information processing apparatus via a network and receiving said data from said other information processing apparatus;

first means for authenticating said other information processing apparatus;

means for storing said data when said other information processing apparatus has been authenticated by said first means for authenticating;

means for connecting with said information storing medium;

second means for authenticating said information storing medium;

means for encrypting said data when said information storing medium has been authenticated by said second means for authenticating;

means for recording encrypted data to said information storing medium when the information storing medium has been authenticated by said second means for authenticating.

5. A method of transmitting and receiving data between an information processing apparatus and an other information processing apparatus or a portable type information terminal apparatus via an information storing medium, the method comprising:

communicating, with the other information processing apparatus via a network to receive data from the other information processing apparatus at the information processing apparatus;

authenticating the other information processing apparatus;
authenticating the information storing medium;

storing the data when the other information processing apparatus has been authenticated;

connecting with the information storing medium which is configured to store data for recording to the portable type information terminal apparatus;

encrypting the data when the information storing medium has been authenticated; and recording encrypted data to the information storing medium when the information storing medium has been authenticated.

6. A non-transitory computer readable medium including computer program instructions that cause a computer to implement a method transmitting and receiving data between an information processing apparatus and an other information processing apparatus or a portable type information terminal apparatus via an information storing medium, the method comprising:

communicating, with the other information processing apparatus via a network to receive data from the other information processing apparatus at the information processing apparatus;

authenticating the other information processing apparatus;
authenticating the information storing medium;

storing the data when the other information processing apparatus has been authenticated;

connecting with the information storing medium which is configured to store data for recording to the portable type information terminal apparatus;

encrypting the data when the information storing medium has been authenticated; and recording encrypted data to the information storing medium when the information storing medium has been authenticated.

7. An information processing apparatus comprising:

an interface unit configured to connect with an information storing medium which is stored data recorded in a portable information terminal;

an authentication unit including
a first authentication unit configured to authenticate the information storing medium, and
a second authentication unit configured to authenticate other information processing apparatus;

a reader unit configured to read the data stored in the information storing medium when the information storing medium has been authenticated by the first authentication unit;

an encryption unit configured to encrypt the data read by the reader unit when the other information processing apparatus has been authenticated by the second authentication unit;

a communication unit configured to transmit the encrypted data to other information processing apparatus via a network.

8. The information processing apparatus according to claim 7, further comprising:

a decrypting unit configured to decrypt said data with a temporary key generated by said authentication unit.

9. The information processing apparatus according to claim 7, wherein said encryption unit encrypts said data with the temporary key generated by said authentication unit.

10. The information processing apparatus according to claim 7, wherein said data stored in said information storing medium is decrypted with the temporary key generated by said information storing medium and said portable type information terminal apparatus are authenticated, and then stored.

11. The information processing apparatus according to claim 7, wherein said network is a broadband network.

* * * * *